United States Patent [19]

Kawase et al.

[11] Patent Number: 4,737,536

[45] Date of Patent: Apr. 12, 1988

[54] AUTOMOBILE BUMPER FORMED OF THERMOPLASTIC MULTICOMPONENT RESIN

[75] Inventors: Toyo Kawase, Atsugi; Yukio Okada, Fujisawa; Yujiro Kawamura, Atsugi; Masashi Ohno, Hatano; Takashi Sugimoto, Yokkaichi, all of Japan

[73] Assignee: Nissan Motor Co., Ltd., Yokohama, Japan

[21] Appl. No.: 874,471

[22] Filed: Jun. 16, 1986

[30] Foreign Application Priority Data

Jun. 19, 1985 [JP] Japan .................................. 60-132026

[51] Int. Cl.$^4$ ...................... C08L 53/02; C08K 3/34
[52] U.S. Cl. .................................. 524/451; 524/505; 525/89; 525/98
[58] Field of Search .................. 525/88, 99, 89; 524/451, 505

[56] References Cited

U.S. PATENT DOCUMENTS

| | | | |
|---|---|---|---|
| 4,371,602 | 2/1983 | Tone et al. | 525/89 |
| 4,412,016 | 10/1983 | Fukui et al. | 523/206 |

FOREIGN PATENT DOCUMENTS

| | | | |
|---|---|---|---|
| 132968 | 2/1985 | Japan | 524/451 |
| 168203 | 1/1986 | Japan | 525/89 |
| 1034048 | 2/1986 | Japan | 524/451 |
| 1097349 | 5/1986 | Japan | 524/451 |

Primary Examiner—Lewis T. Jacobs
Assistant Examiner—David W. Woodward
Attorney, Agent, or Firm—Schwartz, Jeffery, Schwaab, Mack, Blumenthal & Evans

[57] ABSTRACT

Disclosed is an automobile bumper which is formed of a thermoplastic multicomponent resin composition and which is improved in weatherability and impact resistance at low temperatures and also in surface glossiness. Essentially the resin composition is a blend of 22–28 wt % of a hydrogenated block copolymer of an aromatic vinyl compound such as styrene and a conjugated diene such as butadiene, 32–56 wt % of a propylene-ethylene block copolymer in which the content of ethylene is 1–10 wt % and 22–28 wt % of an ethylene-propylene copolymer rubber. Optionally, up to 5 wt % of talc and/or up to 7 wt % of low-pressure low-density polyethylene may be added. Some physical properties of the ingredients are specified such that the resin composition has a melt index not lower than 5 g/10 min at 230° C. under load of 2.16 kg and a modulus of elasticity in bending in the range from 2000 to 4000 kg/cm$^2$.

9 Claims, No Drawings

AUTOMOBILE BUMPER FORMED OF THERMOPLASTIC MULTICOMPONENT RESIN

BACKGROUND OF THE INVENTION

This invention relates to an automobile bumper formed of a thermoplastic multicomponent resin composition.

Nowadays bumpers formed of synthetic resins are widely popular in automobiles. For example, thermosetting urethane resins are used for producing automobile bumpers by a reaction injection molding (RIM) method.

However, thermosetting urethane resins are generally weak in weather resistance so that the molded automobile bumpers need to be heavily painted or very carefully and frequently waxed. Besides, the molding operation suffers from a relatively large number of unacceptable products, and it is impossible to reuse the unaccepted bumpers as the molding material.

Also thermoplastic elastomers (TPE) comprised of propylene-ethylene block copolymer and EPDM rubber are used as injection molding materials for automobile bumpers. However, TPE bumpers are insufficient in impact resistance at low temperatures. In most cases these bumpers break by a 5 km/hr pendulum impact test at −30° C. Therefore, TPE bumpers are practicable only in limited regions. Besides, TPE bumpers are relatively low in surface gloss and, hence, in commercial value. In painting TPE bumpers it is not easy to realize a desirably smooth and beautiful surface of the paint film.

SUMMARY OF THE INVENTION

It is an object of the present invention to provide an automobile bumper which is formed of a thermoplastic resin composition and has sufficient weatherability and impact resistance at low temperatures and, besides, is high in surface gloss.

An automobile bumper member according to the invention is formed of a thermoplastic resin composition which comprises (a) 22–28 wt % of a hydrogenated block copolymer which is represented, before hydrogenation. by the general formula A—B—A)$_n$, wherein A represents a block of polymer of a monovinyl substituted aromatic hydrocarbon, B represents a block of an elastomeric polymer of a conjugated diene and n is an integer from 1 to 5, and of which the melt index at 230° C. under load of 5 kg is in the range from 1 to 15 g/10 min, (b) 32–56 wt % of a propylene-ethylene block copolymer in which the content of ethylene is 1–10 wt % and which comprises 5–20 wt % of a soluble portion, which is soluble in xylene at room temperature and contains 25–35 wt % of ethylene, on condition that the melt index of this block copolymer at 230° C. under load of 2.16 kg is in the range from 50 to 100 g/10 min, (c) 22–28 wt % of an ethylene-propylene copolymer rubber of which the Mooney viscosity at 100° C. is in the range from 10 to 65, (d) 0–5 wt % of talc and (e) 0–7 wt % of a low-pressure low-density polyethylene of which the melt index at 190° C. under load of 2.16 kg is in the range from 10 to 50 g/10 min. The resin composition must satisfy the following requirements: (i) the melt index of the resin composition at 230° C. under load of 2.16 kg should be at least 5 g/10 min, and (ii) the modulus of elasticity in bending should be in the range from 2000 to 4000 kg/cm$^2$.

In the resin composition used in this invention, a preferred example of the component (a) is a hydrogenated block copolymer of styrene and butadiene or isoprene. Such a copolymer is an excellent thermoplastic elastomer. This copolymer is blended with a propylene-ethylene block copolymer and ethylene-propylene copolymer rubber (EPR) in the above specified proportions and with the above stated limitations on the melt index (melt flow rate) or viscosity of the respective components so as to obtain a resin composition having a sufficiently high melt index and an adequate modulus of elasticity in bending. It is possible and preferable to afford this resin composition with good surface gloss, viz. not lower than 60% in terms of specular gloss measured by the 60°–60° method. Automobile bumpers according to the invention are sufficiently high in weather resistance and impact resistance at low temperatures, and also in surface gloss, and the bumpers can easily be produced by conventional molding methods including injection molding methods.

DESCRIPTION OF THE PREFERRED EMBODIMENTS

The particulars of the thermoplastic resin composition used in this invention are as follows.

In the block copolymer represented by the general formula A—B—A)$_n$, which is employed as the component (a), styrene is preferred as the monovinyl substituted aromatic hydrocarbon monomer which provides the block A. If desired. α-methylstyrene can be used in place of styrene. Butadiene or isoprene, or a mixture of butadiene and isoprene, is preferred as the conjugated diene monomer which provides the block B. When butadiene is the sole constituent of the block B, it is desirable to carry out polymerization under such conditions that the 1,2-microstructure occupies 20–50%, and preferably 35–45%, of the microstructure of the polybutadiene block B in order that the block copolymer may retain an elastomeric property after saturation of its double bonds by hydrogenation.

A desired block copolymer of, for example, styrene and butadiene can be prepared by various and well known polymerization methods. In a typical method, block copolymerization is performed in an inactive solvent by using either a lithium catalyst or a Ziegler-Natta catalyst. Hydrogenation of the obtained copolymer can be accomplished by a conventional technique using a hydrogenation catalyst usually in an inactive solvent. It is suitable to hydrogenate the block copolymer to such a degree that at least 50%, and preferably at least 80%, of the olefinic double bonds in the polymer block B undergo hydrogenation whereas not more than 25% of the aromatic unsaturated bonds in the block A undergo hydrogenation. For example, a series of hydrogenated block copolymers of styrene and butadiene useful in the present invention are supplied from Shell Chemical Co. under the tradename of KRATON-G.

It is important that the melt flow rate (melt index) of the hydrogenated block copolymer be in the range from 1 to 15 g/10 min when measured at 230° C. under a load of 5 kg. In this regard it is permissible to use a mixture of block copolymers which are composed of the same monomers and exhibit different melt indices at least one of which is outside the aforementioned range if the melt index of the mixture falls in the same range. If the melt index of the hydrogenated copolymer is below 1 g/10 min the resin composition becomes inferior in flow and gloss, and consequently flow marks will appear on the surfaces of the molded bumpers and the bumpers will not have high gloss. On the other hand, when the melt index of the component (a) is above 15 g/10 min the resin composition often fails to provide sufficiently tough bumpers and, as another matter of disadvantage, becomes sticky at the time of molding so that difficulty is encounted in releasing the molded bumpers from the metal die.

In the resin composition the content of the component (a) is limited within the range from 22 to 28 wt % for the following reasons. When the content of the component (a) is less than 22 wt % it is often that the resin composition is insufficient in elasticity so that bumpers sufficiently high in impact resistance can hardly be obtained. If the content of the component (a) is more than 28 wt % it is likely that the resin composition is low in both flow and gloss so that the obtained bumpers hardly meet the requirements as to appearance.

A propylene-ethylene block copolymer is used as the component (b). In this invention it is impermissible to use homopolymers of propylene in place of the copolymer because it is impossible to achieve desired enhancement of the impact resistance of the resin composition by using the homopolymer. The melt index of the propylene-ethylene block copolymer must be in the range from 50 to 100 g/10 min, and preferably from 60 to 80 g/10 min, when measured at 230° C. under a load of 2.16 kg. In this regard it is permissible to use a mixture of propylene-ethylene copolymers that exhibit different melt indices at least one of which is outside the above specified range if the melt index of the mixture falls in the same range. When the melt index of the component (b) is below 50 g/10 min molding of the resultant resin composition into bumpers will suffer from short shot and frequent appearance of flow marks on the bumpers. If the melt index of the component (b) is above 100 g/10 min the resin composition fails to provide bumpers with sufficiently high impact resistance. Furthermore, the propylene-ethylene copolymer as the component (b) is required to contain 1-10 wt % of ethylene and to be 5-20 wt % in the amount of a soluble portion, which is soluble in xylene at room temperature and in which ethylene amounts to 25-35 wt %. These requirements need to be met in order to obtain a resin composition which is sufficiently high in impact resistance and also in scratch resistance and is good in moldability and glossiness.

In the resin composition the content of the component (b) is limited within the range from 32 to 56 wt % for the following reasons. When the content of the component (b) is less than 32 wt % the resin composition will not be good in its flow and moldability so that the molded bumpers will have flow marks, which mar the appearance, and will be insufficient in scratch resistance. When the content of the component (b) is more than 56 wt % the resin composition becomes too high in rigidity so that the molded bumpers lack in a soft-to-touch appearance and rarely possesses sufficiently high impact resistance.

An ethylene-propylene binary copolymer rubber is used as the component (c). The resin composition may not possess sufficient flexibility if the content of propylene in the component (c) is too low and, on the other hand, will be insufficient in mechanical strength if the propylene content in the component (c) is too high. It is preferred to use an ethylene-propylene copolymer rubber containing 25-50 wt % of propylene.

The Mooney Viscosity, ML1+4(100° C.), of the ethylene-propylene copolymer rubber must fall in the range from 10 to 65, and preferably from 10 to 50. In this regard it is permissible to use a mixture of ethylene-propylene copolymer rubbers of different grades if an average of the Mooney viscosity values of the respective rubbers falls in the specified range. If the Mooney viscosity of the rubber is below 10 the resin composition will become inferior in compatibilities between the ingredients so that molding of the resin composition into bumpers often suffers from occurrence of delamination. When the Mooney viscosity of the rubber is higher than 65 it is likely that bumpers formed of the resin composition have flow marks and have not good gloss.

In the resin composition the content of the component (c) is limited within the range from 22 to 28 wt % for the following reasons. When the content of the component (c) is less than 22 wt % it is often that bumpers formed of the resin composition are insufficient in flexibility and, therefore, are weak in the capability to recover from deforming strains. If the content of the component (C) is more than 28 wt % the resin composition becomes sticky at the time of molding so that the molded bumpers cannot smoothly be released from the metal die.

It is preferred to add an adequate amount of talc to the blend of the above described essential components (a), (b) and (c). The addition of talc is effective for the bumpers formed of the resin composition in increasing rigidity at high temperatures and improving stability of dimensions. In this invention it is suitable to use talc having a mean particle size of 0.2-25 $\mu$m and a specific surface area not smaller than 30,000 cm$^2$/g. As to the particle size distribution, it is suitable that more than 95% of the entire particles are not larger than 10 $\mu$m, more than 85% are not larger than 5 $\mu$m, and 5-95% are not larger than 1 $\mu$m. The maximum content of talc in the resin compositions is limited to 5 wt % because the addition of a larger amount of talc leads to significant lowering of the impact resistance of the bumpers and also mechanical strength of the bumpers in regions along weld lines.

Also it is preferred that the resin composition contains an adequate amount of low-pressure processed low-density polyethylene (will be referred to simply as polyethylene), because polyethylene has the effect of increasing the surface gloss of the molded bumpers and preventing the gloss from significantly decreasing by the influence of solvent used in cleaning the bumpers precedent to painting, whereby the commercial value of the bumpers can be enhanced. The maximum content of polyethylene in the resin composition is limited to 7 wt %, because the addition of a larger amount of polyethylene leads to lowering of dispersibility of the resin composition so that the molded bumpers often have a defective appearance attributed to delamination at the molding stage.

Besides, any of the auxiliary additives commonly used in conventional resin compositions for molding uses may optionally be used in the present invention. For example, antioxidant, ultraviolet absorbing agent, lubricating agent and/or pigment may be added to a resin composition for use in this invention.

A thermoplastic resin composition specified in this invention can be prepared by uniformly blending the above described essential and optional ingredients. It is suitable to employ such a blending method as causes melting of at least a major part of the polymer components. For accomplishment of good and uniform blending and compounding it is most suitable to use a twin-screw extruder though a single-screw extruder or any other suitable machine can alternatively be used. Usually the uniformly blended resin composition is processed into the form of pellets.

Using a thermoplastic resin composition described above, automobile bumpers according to the invention are formed by a conventional molding method. For example, the resin composition is molded into bumpers by an injection molding method, injection compression molding method or a stamping method. It is optional whether to paint the molded bumpers in a desired color or to leave the bumpers as molded to thereby utilize the color of the resin composition itself. For example, a polyurethane base paint may be applied to the bumpers after cleaning with a vapor of a suitable solvent such as 1,1,2-trichloro-1,2,2-trifluoroethane or cleaning by a low-temperature plasma treatment.

EXAMPLES 1–5

Five kinds of thermoplastic resin compositions all of which meet the requirements of the present invention were prepared for use in Examples 1 to 5, respectively. by selectively using the essential and optional materials listed below.

Component (a): styrene-butadiene block copolymer
 (a-1): KRATON-G¡1652 of Shell Chemical Co., which exhibits melt flow rate of 3.0 g/10 min (at 230° C., under load of 5 kg).
 (a-2): KRATON-G1657, which exhibits a melt flow rate of 25.0 g/10 min (230° C., 5 kg).

Component (b): propylene-ethylene block copolymer
 (b-1): content of ethylene was 7 wt %; soluble portion (soluble in xylene at room temperature) was 15 wt % and contained 30 wt % of ethylene: melt flow rate was 60 g/10 min (230° C., 216 kg).
 (b-2): content of ethylene was 3.5 wt %; soluble portion was 7.5 wt % and contained 30 wt % of ethylene; melt flow rate was 80 g/10 min (230° C., 2.16 kg).

Component (c): ethylene-propylene copolymer rubber
 (c-1): content of ethylene was 74 wt %; Mooney viscosity ML1+4(100° C.) was 23.

Component (d): talc, 2.0 μm in mean particle size and 40,000 cm²/g in specific surface area.

Component (e): low-pressure low-density polyethylene, melt flow rate was 20 g/10 min (190° C., 2.16 kg).

Component (f): oleic amide.

Each resin composition was prepared by first mixing the selected materials for 2 min in a supermixer and then kneading the mixture at 220° C. by using a twin-screw kneader. The kneaded resin composition was pelletized. Table 1 shows the proportions of the blended materials and physical characteristics of the resin compositions prepared in Examples 1–5.

The melt flow rate (melt index) was measured by the method according to JIS (Japanese Industrial Standard) K 7210, at 230° C. under load of 2.16 kg for every resin composition. Test pieces for testing other characteristics of each resin composition were prepared by using an in-line screw injection molding machine in which the resin composition was heated to 240° C. The modulus of elasticity in bending was measured at 23° C. by the method according to JIS K 7203. The surface glossiness (specular gloss) was measured by the 60°–60° method according to JIS Z 8741. In the "flow mark" test, 100 mm×360 mm wide and 3 mm thick test pieces prepared by injection molding were carefully surveyed to judge whether any flow mark was present or not. The heat distortion temperature was measured by the method according to JIS K 7207 wherein the load was 4.6 kg/cm². The Izod impact test was in accordance with JIS K 7110. The test was made at −40° C. The fractured test pieces were surveyed and marked "tough" if not completely severed at the notched section and marked "brittle" if completely severed at that section.

TABLE 1

|  | Ex. 1 | Ex. 2 | Ex. 3 | Ex. 4 | Ex. 5 |
|---|---|---|---|---|---|
| Resin Components (wt %) | | | | | |
| (a-1) KRATON-G1652 | 25 | 13* | 25 | 25 | 25 |
| (a-2) KRATON-G1657 | | 12* | | | |
| (b-1) P/E block copolymer | 50 | 50 | 47 | 48 | |
| (b-2) P/E block copolymer | | | | | 50 |
| (c-1) E/P copolymer rubber | 25 | 25 | 25 | 25 | 25 |
| (d) talc | | | | 2 | |
| (e) polyethylene | | | 3 | | |
| (f) oleic amide (phr) | 0.5 | 0.5 | 0.5 | 0.5 | 0.5 |
| Resin Composition | | | | | |
| melt flow rate (g/10 min) | 13 | 15 | 13 | 13 | 18 |
| modulus of elasticity in bending (kg/cm²) | 3200 | 3000 | 3000 | 3500 | 3300 |
| surface gloss (%) | 78 | 82 | 85 | 78 | 76 |
| flow mark | no | no | no | no | no |
| heat distortion temperature (°C.) | 68 | 67 | 71 | 74 | 68 |
| Izod impact, at −40° C. | tough | tough | tough | tough | tough |
| Bumper | | | | | |
| quality of surface | good | good | good | good | good |
| pendulum impact, at −30° C. | no break | no break | no break | no break | no break |

*melt flow rate of mixture was 8 g/10 min (230° C., 5 kg).

The five kinds of resin compositions were each molded into automobile bumpers by using a large-sized injection molding machine of the in-line screw type. The mold clamping force was 2000 metric tons: molding temperature was 240° C.; and the die temperature was 25° C. Every bumper was 1620 mm in width, 270 mm in height, 400 mm in depth and 4 mm in standard wall thickness.

The obtained bumpers were examined by visual observation to evaluate the quality of the surface in regard to existence or absence of flow marks, degree of delamination and appearance of flow line. As shown in Table 1, all the bumpers of Examples 1–5 were judged to be good in the quality of surface.

Next, the bumpers of Examples 1–5 were painted by first forming a primer coating film having a thickness of about 7 μm, then applying a polyurethane base paint to form a topcoat film having a thickness of 40 μm and making a bake-curing treatment at 120° C. for 30 min. After that each of these bumpers was incorporated into a bumper system by first inserting a polypropylene foam (expansion ratio:15) in the recess on the rear side of the bumper over the entire width of the bumper and then attaching a base member of high-tensile steel to the rear side of the bumper. Each bumper system was bolted to a car body and was cooled so as to maintain the temperature of the resin bumper at −30° C. In that state the impact resistance of the bumper was tested by using a pendulum impact tester (in accordance with FMVSS, Part 581). The pendulum struck the bumper right upon the front at a velocity of 8 km/hr. As shown in Table 1, the bumpers of Examples 1-5 all passed this test without breaking.

REFERENCES 1-10

For comparison, ten kinds of thermoplastic resin compositions each of which failed to satisfy all the requirements of the present invention were prepared by selectively using the materials listed hereinbefore and the substitutive materials listed below.

Component (a): styrene-butadiene block copolymer
  (a-3): KRATON-G1650, which exhibited a melt flow rate of 0.1 g/10 min (230° C., 5 kg).

Component (b): propylene-ethylene block copolymer
  (b-3): content of ethylene was 7 wt %; soluble portion (soluble in xylene at room temperature) was 15 wt % and contained 30 wt % of ethylene; melt flow rate was 120 g/10 min (240° C., 2.16 kg).
  (b'): homopolymer of propylene; melt flow rate was 50 g/10 min (230° C., 2.16 kg).

Component (c): ethylene-propylene copolymer rubber
  (c-2): content of ethylene was 74 wt %; Mooney viscosity ML1+4(100° C.) was 70.

Table 2 shows the proportions of the blended materials in preparing the ten kinds of resin compositions and the physical characteristics of the obtained resin compositions.

The resin compositions of References 1-5 were each molded into the automobile bumpers in the same manner as in Examples 1-5. The bumpers as molded were examined by visual observation to evaluate the quality of the surface. As shown in Table 2, only the bumpers of References 3 and 7 were judged to be good in the quality of surface. Then, the bumpers of References 3 and 7 were painted in the same manner as in Examples 1-5 and were each subjected to the pendulum impact test at −30° C. in the same state as in Examples 1-5. In this case the tested bumpers all broke.

TABLE 2

|  | Ref. 1 | Ref. 2 | Ref. 3 | Ref. 4 | Ref. 5 |
| --- | --- | --- | --- | --- | --- |
| Resin Components (wt %) | | | | | |
| (a-1) KRATON-G1652 | 30 | 20 | 20 | 40 | 25 |
| (a-3) KRATON-G1650 | | | | | |
| (b-1) P/E block copolymer | 50 | 50 | 60 | 30 | 40 |
| (b-3) P/E block copolymer | | | | | |
| (b') polypropylene | | | | | |
| (c-1) E/P copolymer rubber | 20 | 30 | 20 | 30 | 25 |
| (c-2) E/P copolymer rubber | | | | | |
| (d) talc | | | | | |
| (e) polyethylene | | | | | 10 |
| (f) oleic amide (phr) | 0.5 | 0.5 | 0.5 | 0.5 | 0.5 |
| Resin Composition | | | | | |
| melt flow rate (g/10 min) | 11 | 10 | 16 | 5 | 9 |
| modulus of elasticity in bending (kg/cm$^2$) | 3300 | 3200 | 4200 | 1500 | 3400 |
| surface gloss (%) | 78 | 76 | 70 | 45 | 85 |
| flow mark | found | found | no | found | found |
| heat distortion temperature (°C.) | 65 | 64 | 73 | 52 | 66 |
| Izod impact, at −40° C. | tough | tough | brittle | tough | tough |
| Bumper | | | | | |
| quality of surface | (*1) | (*2) | good | (*2) | (*2) |
| pendulum impact, at −30° C. | — | — | broken | — | — |

TABLE 2-continued

|  | Ref. 6 | Ref. 7 | Ref. 8 | Ref. 9 | Ref. 10 |
| --- | --- | --- | --- | --- | --- |
| Resin Components (wt %) | | | | | |
| (a-1) KRATON-G1652 | 25 | 25 | 25 | 25 | |
| (a-3) KRATON-G1650 | | | | | 25 |
| (b-1) P/E block copolymer | 43 | | | 50 | 50 |
| (b-3) P/E block copolymer | | | 50 | | |
| (b') polypropylene | | 50 | | | |
| (c-1) E/P copolymer rubber | 25 | 25 | 25 | | 25 |
| (c-2) E/P copolymer rubber | | | | 25 | |
| (d) talc | 7 | | | | |
| (e) polyethylene | | | | | |
| (f) oleic amide (phr) | 0.5 | 0.5 | 0.5 | 0.5 | |
| Resin Composition | | | | | |
| melt flow rate (g/10 min) | 10 | 12 | 25 | 7 | 5 |
| modulus of elasticity in bending (kg/cm$^2$) | 4300 | 3600 | 3100 | 3200 | 3000 |
| surface gloss (%) | 75 | 79 | 76 | 40 | 35 |
| flow mark | found | no | found | found | found |
| heat distortion temperature (°C.) | 75 | 70 | 67 | 67 | 68 |
| Izod impact, at −40° C. | brittle | brittle | brittle | tough | tough |
| Bumper | | | | | |
| quality of surface | (*3) | good | (*1) | (*1) | (*1) |
| pendulum impact, at −30° C. | — | broken | — | — | — |

(*1) flow marks appeared.
(*2) delamination occurred.
(*3) weld line was conspicuous.

What is claimed is:

1. An automobile bumper member formed of a thermoplastic resin composition which consists essentially of:
   (a) 22-28 wt % of a hydrogenated block copolymer which is represented, before hydrogenation, by the general formula A—(B—A)$_n$, wherein A represents a block of polymer of a monovinyl substituted aromatic hydrocarbon, B represents a block of an elastomeric polymer of a conjugated diene and n is an integer from 1 to 5, the melt index of said hydrogenated block copolymer at 230° C. under load of 5 kg being in the range from 1 to 15 g/10 min;
   (b) 32-56 wt % of a propylene-ethylene block copolymer in which the content of ethylene is 1-10 wt % and which comprises 5-20 wt % of a soluble portion which is soluble in xylene at room temperature and contains 25-35 wt % of ethylene, the melt index of said propylene-ethylene block copolymer at 230° C. under load of 2.16 kg being in the range from 50 to 100 g/10 min;
   (c) 22-28 wt % of an ethylene-propylene copolymer rubber of which the Mooney viscosity at 100° C. is in the range from 10 to 65;
   (d) 0-5 wt % of talc: and
   (e) 0-7 wt % of a low-pressure low-density polyethylene of which the melt index at 190° C. under load of 2.16 kg is in the range from 10 to 50 g/10 min, the melt index of said resin composition at 230° C. under load of 2.16 kg being not lower than 5 g/10 min, the modulus of elasticity in bending of said resin composition being in the range from 2000 to 4000 kg/cm$^2$.

2. A bumper member according to claim 1, wherein the surface glossiness of said resin composition is not lower than 60% in terms of specular gloss measured by the 60°–60° method.

3. A bumper member according to claim 1, wherein said monovinyl substituted aromatic hydrocarbon is selected from styrene and α-methylstyrene.

4. A bumper member according to claim 1, wherein said conjugated diene is selected from the group consisting of butadiene, isoprene and mixtures of butadiene and isoprene.

5. A bumper member according to claim 1, wherein said polymer of a conjugated diene is polybutadiene in which a microstructure of 1,2-butadiene amounts to 20–50%.

6. A bumper member according to claim 1, wherein said block copolymer represented by said general formula is hydrogenated such that at least 50% of the olefinic double bonds in the block B undergo hydrogenation whereas not more than 25 % of the aromatic unsaturated bonds in the block A undergo hydrogenation.

7. A bumper member according to claim 1, wherein the melt index of said propylene-ethylene block copolymer is in the range from 60 to 80.

8. A bumper member according to claim 1, wherein said ethylene-propylene copolymer rubber contains 25–50 wt % of propylene.

9. A bumper member according to claim 1, wherein said talc is 0.2–25 μm in mean particle size and not smaller than 30,000 cm$^2$/g in specific surface area.

* * * * *